(12) United States Patent
Richardson

(10) Patent No.: US 11,263,298 B2
(45) Date of Patent: Mar. 1, 2022

(54) PERSISTENT AUTHENTICATION SYSTEM INCORPORATING ONE TIME PASS CODES

(71) Applicant: HAVENTEC PTY LTD, Sydney (AU)

(72) Inventor: Ric B. Richardson, Ewingsdale (AU)

(73) Assignee: HAVENTEC PTY LTD, Sydney (AU)

( * ) Notice: Subject to any disclaimer, the term of this patent is extended or adjusted under 35 U.S.C. 154(b) by 0 days.

(21) Appl. No.: 16/717,878

(22) Filed: Dec. 17, 2019

(65) Prior Publication Data

US 2020/0127838 A1 Apr. 23, 2020

Related U.S. Application Data

(63) Continuation of application No. 15/126,434, filed as application No. PCT/AU2015/000149 on Mar. 16, 2015, now Pat. No. 10,541,815.

(30) Foreign Application Priority Data

Mar. 16, 2014 (AU) .............................. 2014900894

(51) Int. Cl.
 *G06F 7/04* (2006.01)
 *G06F 15/16* (2006.01)
 (Continued)

(52) U.S. Cl.
 CPC ............ *G06F 21/31* (2013.01); *H04L 9/0863* (2013.01); *H04L 9/0866* (2013.01);
 (Continued)

(58) Field of Classification Search
 CPC ............ G06F 21/31; G06F 2221/2139; H04W 12/068; H04W 12/069; H04L 9/0863;
 (Continued)

(56) References Cited

U.S. PATENT DOCUMENTS

| 4,578,531 A | 3/1986 | Everhart et al. |
| 5,875,296 A | 2/1999 | Shi et al. |

(Continued)

FOREIGN PATENT DOCUMENTS

| CN | 1703003 A | 11/2005 |
| CN | 101022455 A | 8/2007 |

(Continued)

OTHER PUBLICATIONS

International Search Report (ISR) dated Jun. 30, 2015 for Application No. PCT/AU2015/000149.

(Continued)

*Primary Examiner* — Darshan I Dhruv
(74) *Attorney, Agent, or Firm* — Ladas & Parry LLP

(57) ABSTRACT

A method of maintaining ongoing authentication of a user of an application without the need to enter and re-enter a username and a corresponding password for each session initiated between a client side application residing on a client side platform and a server; and wherein the password is not stored on the server; the method comprising utilising an unbroken chain of one-time pass codes; each pass code in the chain being unique to the username and client side application; each pass code renewed periodically and preferably at least once during each said session.

22 Claims, 4 Drawing Sheets

Figure 1A:
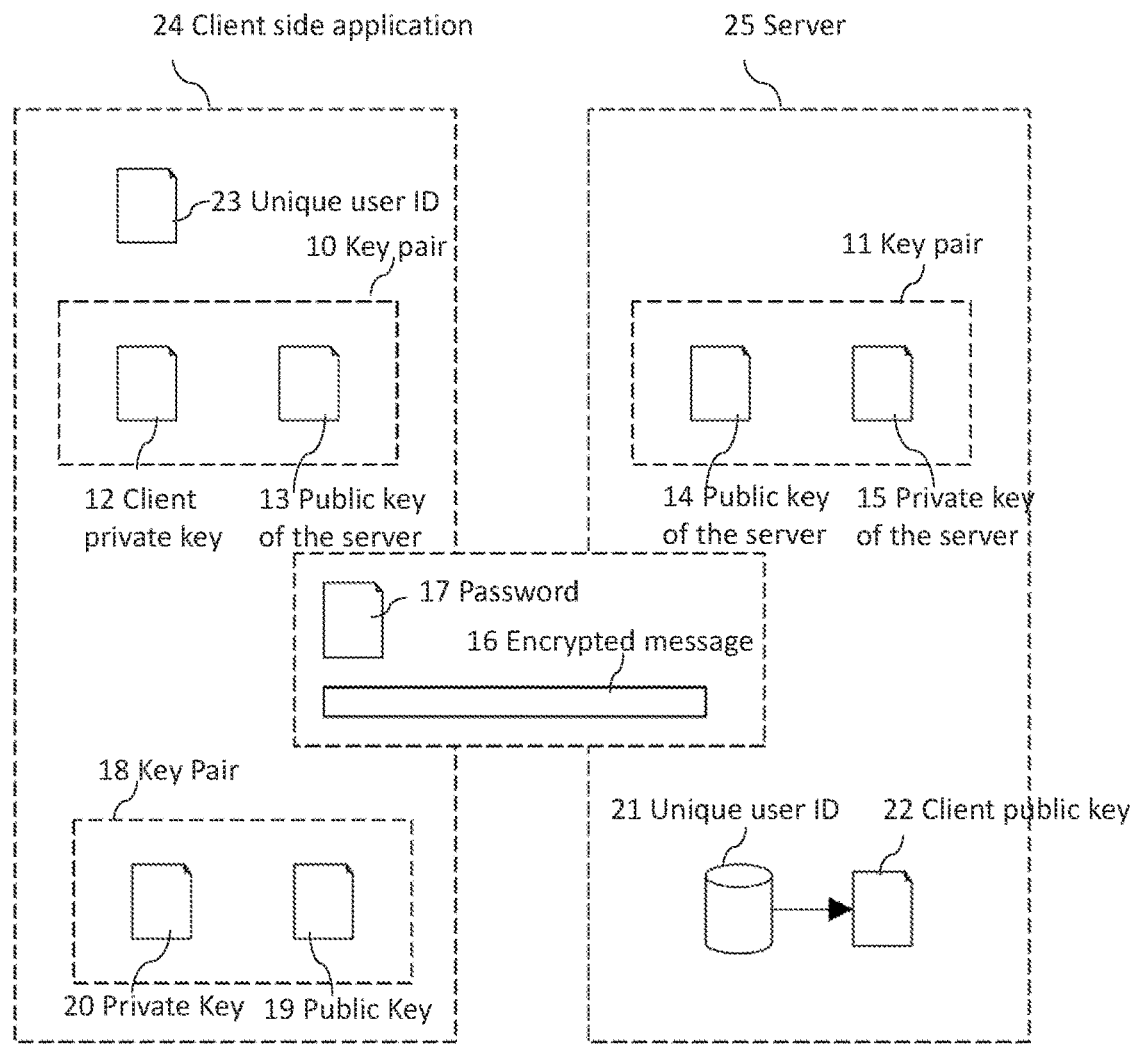

(51) Int. Cl.
| | |
|---|---|
| *G06F 21/31* | (2013.01) |
| *H04L 29/06* | (2006.01) |
| *H04L 9/32* | (2006.01) |
| *H04L 9/08* | (2006.01) |
| *H04W 12/06* | (2021.01) |
| *H04W 12/069* | (2021.01) |

(52) U.S. Cl.
CPC .......... *H04L 9/3228* (2013.01); *H04L 9/3234* (2013.01); *H04L 63/0838* (2013.01); *H04W 12/068* (2021.01); *H04W 12/069* (2021.01); *G06F 2221/2139* (2013.01)

(58) Field of Classification Search
CPC ... H04L 9/0866; H04L 9/3228; H04L 9/3234; H04L 63/0838
See application file for complete search history.

(56) References Cited

U.S. PATENT DOCUMENTS

| | | | |
|---|---|---|---|
| 6,134,592 A | 10/2000 | Montulli | |
| 6,205,480 B1 | 3/2001 | Broadhurst et al. | |
| 6,421,768 B1 | 7/2002 | Purpura | |
| 6,668,322 B1 | 12/2003 | Wood et al. | |
| 7,523,490 B2 | 4/2009 | Guo et al. | |
| 8,447,977 B2 | 5/2013 | Slick et al. | |
| 2002/0141575 A1* | 10/2002 | Hird | H04L 9/3247 380/44 |
| 2004/0059922 A1* | 3/2004 | Harris | G10L 17/22 713/186 |
| 2005/0120219 A1 | 6/2005 | Munetoh et al. | |
| 2006/0036857 A1* | 2/2006 | Hwang | G06F 21/31 713/168 |
| 2006/0198517 A1* | 9/2006 | Cameron | G06F 21/445 380/44 |
| 2007/0220273 A1* | 9/2007 | Campisi | G06Q 20/3574 713/186 |
| 2007/0241182 A1 | 10/2007 | Buer | |
| 2008/0120504 A1* | 5/2008 | Kirkup | H04L 9/3226 713/176 |
| 2008/0162934 A1 | 7/2008 | Okawa | |
| 2009/0106551 A1* | 4/2009 | Boren | H04L 9/3226 713/158 |
| 2009/0288143 A1 | 11/2009 | Stebila et al. | |
| 2009/0319782 A1* | 12/2009 | Lee | G06F 21/575 713/156 |
| 2011/0231912 A1* | 9/2011 | Lee | G06F 21/335 726/7 |
| 2011/0320820 A1 | 12/2011 | Wray | |
| 2012/0204245 A1* | 8/2012 | Ting | H04L 9/3228 726/6 |
| 2013/0219472 A1 | 8/2013 | Hsu | |
| 2013/0239195 A1* | 9/2013 | Turgeman | G06F 21/31 726/7 |
| 2013/0262857 A1 | 10/2013 | Neuman et al. | |
| 2013/0268687 A1* | 10/2013 | Schrecker | H04W 12/06 709/229 |
| 2013/0268767 A1* | 10/2013 | Schrecker | G06F 21/31 713/185 |
| 2014/0188770 A1* | 7/2014 | Agrafioti | A61B 5/7267 706/13 |
| 2014/0282942 A1* | 9/2014 | Berkman | G06F 21/31 726/6 |
| 2014/0316984 A1* | 10/2014 | Schwartz | G06Q 20/40145 705/44 |
| 2014/0359744 A1* | 12/2014 | Hillis | G06F 21/34 726/9 |
| 2015/0161410 A1* | 6/2015 | Andersen | H04L 63/061 713/165 |
| 2015/0195278 A1* | 7/2015 | Plotkin | H04L 9/3271 713/186 |
| 2015/0242605 A1* | 8/2015 | Du | G06F 21/32 726/7 |
| 2015/0347777 A1* | 12/2015 | Gregan | G06F 16/284 726/7 |
| 2016/0127351 A1* | 5/2016 | Smith | H04L 63/12 726/10 |

FOREIGN PATENT DOCUMENTS

| | | |
|---|---|---|
| CN | 101232379 A | 7/2008 |
| JP | 10-336169 A | 12/1998 |
| JP | 2005-167589 A | 6/2005 |
| WO | 2008/035450 A1 | 3/2008 |

OTHER PUBLICATIONS

Haller, N., "A One-Time Password System", Society Symposium on Network and Distributed System Security, Feb. 3, 1994, pp. 1-7.
Haller, N., et al., "One-Time Password System", Kaman Sciences Corporation, May 1996, pp. 1-18.
Goyal, V., et al., "The N/R One Time Password System", Information Technology: Coding and Computing, vol. 1, 2005, 6 pages.
Paterson, K., et al., "One-time-password-authenticated key exchange", Apr. 19, 2010, pp. 1-18.
Lamport, L., "Password Authentication with Insecure Communication", Communications of the ACM, vol. 24, Issue 11, Nov. 1981, pp. 770-772.
Bicakci, K., et al., "Infinite Length Hash Chains and Their Applications", Proceedings of the Eleventh IEEE International Workshops on Enabling Technologies: Infrastructure for Collaborative Enterprises, 2002, 5 pages.
International Preliminary Report on Patentability (IPRP) dated Sep. 20, 2016 for International Application No. PCT/AU2015/000149.
Patent Examination Report No. 1 dated Oct. 25, 2016 mailed in connection with AU 2015234221.
M'Raihi, D., et al., "TOTP: Time-Based One-Time Password Algorithm", Internet Engineering Task Force (IETF), May 2011, pp. 1-16.
Japanese Office Action (Notification of Reasons for Refusal) with an English translation dated Dec. 4, 2018 for Application No. JP 2016-557958.
Chinese Office Action with an English translation dated Feb. 27, 2019 for Application No. CN 201580024566.0.
Espacenet English abstract of WO 2008/035450 A1.
Espacenet English abstract of JP 10-336169 A.
Espacenet English abstract of CN 101022455 A.
Espacenet English abstract of CN 1703003 A.
Espacenet English abstract of CN 101232379 A.
Takamichi Saito, *Masuratingu TCP/IP Jouhou sekyuriti ben* [Mastering TCP /IP Information Security], Ohmsha, Sep. 1, 2018, pp. 215 220.
English translation of Japanese exam report dated Nov. 22. 2021 for Application No. JP 2020-000501.
espacenet English abstract of JP 2005-167589 A.

* cited by examiner

PERSISTENT AUTHENTICATION SYSTEM INCORPORATING ONE TIME PASS CODES

RELATED APPLICATION

This application is a continuation of U.S. application Ser. No. 15/126,434 filed Sep. 15, 2016, which is an application under 35 U.S.C. 371 of International Application No. PCT/AU2015/000149 filed on Mar. 16, 2015, the entire contents of which are incorporated herein by reference.

The present invention relates to a persistent authentication system incorporating one time pass codes and more particularly, but not exclusively such a system which does not require a user of the system to enter and re-enter a username and a corresponding password for a user session initiated by the user.

BACKGROUND

The use of usernames and passwords is well known in the art. A growing problem exists where the server side storage of passwords is becoming more prone to attack and the burden on users to use different and secure passwords across multiple web sites has introduced inconvenience, inordinate complication and continuing security exposure.

Attempts to solve this problem include device hardware fingerprinting or other multi factor authentication such as biometrics. These are used in an attempt to bolster the security and reduce the exposure of problems associated with standard username and password authentication systems. However; typically they only add more steps of complexity and inconvenience to an already burdensome process.

One example of such an attempt is U.S. Pat. No. 5,875,296 to IBM the content of which is incorporated herein by cross reference. Its solution is outlined in claim 1 thereof which reads:

A method of authenticating a client to a Web server connectable to a distributed file system of a distributed computing environment, the distributed computing environment including a security service for returning a credential to a user authenticated to access the distributed file system, comprising the steps of:

responsive to receipt by the Web server of a user id and password from the client, executing a login protocol with the security service and storing a credential resulting therefrom;

returning to the client a persistent client state object having an identifier therein; and having the client use the persistent client state object including the identifier in lieu of a user id and password to obtain subsequent access to Web documents in the distributed file system.

This arrangement can be interpreted as utilising a "cookie" as the persistent client state object. This arrangement suffers from significant security issues.

Further prior art examples (all of which are included by cross reference) include:

U.S. Pat. No. 8,447,977 Canon KK whose main claim reads:

A method of authenticating a device with a server over a network, the method comprising the steps of:

establishing, by the device, a secure connection with the server;

communicating, by the device, identification information of the device to the server, wherein the identification information uniquely identifies the device to the server and is pre-stored in the device;

determining, by the server, the credibility of the device using the identification information communicated by the device; and in a case where the server determines that the device is credible:

creating, by the server, a first authentication token for the device, the first authentication token indicating that the device is credible;

storing, by the server, the first authentication token;

transferring, by the server, the first authentication token to the device using the secure connection; and storing, by the device, the first authentication token;

wherein the method further comprises the steps of:

establishing, by the device, a secure re-connection with the server; and authenticating, by the server and over the secure re-connection, the device using the first authentication token stored by the device.

U.S. Pat. No. 6,668,322 Sun MicroSystems whose main claim reads

A session credential for use in a security architecture controlling access to one or more information resources, the session credential comprising:

a principal identifier uniquely identifying a principal; and an encoding of authorization accorded by the security architecture after prior authentication of a login credential corresponding to the principal, the principal identifier and authorization encoding being cryptographically secured and allowing the security architecture to evaluate sufficiency of the authorization for access to the one or more information resources without re-authentication of the login credentials.

U.S. Pat. No. 6,421,768 First Data whose main claim reads

A method for transferable authentication, by which a user accessing a first computer can be authenticated to a second computer remote from said first computer, without necessarily requiring the user to explicitly identify himself to said second computer, comprising the steps of:

at a user's computer, accessing said first computer;

authenticating said user to said first computer;

receiving from said first computer a cookie including said first computer's digital voucher of a user characteristic, said voucher being cryptographically assured by said first computer, said user characteristic being encrypted and incorporated into said digital voucher by said first computer using a client side public key confidential to said first computer and said second computer but unknown to said user, said client side public key being cryptographically assured using an asymmetric key of at least one of said first computer and said second computer;

transmitting said cryptographically assured client side public key to said second computer via said user's computer; and sending at least a portion of said cookie, including said voucher, to said second computer configured to:

authenticate said voucher without necessarily requiring said user to explicitly identify himself to said second computer;

extract said user characteristic from said voucher; and perform an action based on said user characteristic.

As stated above cookies have particular security issues and have ongoing adoption issues these days.

Also disclosed are the following which disclose alternative ways of seeking to secure systems without the use of repetitive password entry and explicit communication of the password from one machine to another. These systems can be more complex including the use of a third party machine to perform verification/authentication.

U.S. Pat. No. 4,578,531 AT&T
U.S. Pat. No. 6,134,592 Netscape
U.S. Pat. No. 6,205,480 Computer Assoc
U.S. Pat. No. 7,523,490 Microsoft
US20110320820 IBM
US20130219472 A1 QSAN Embodiments of the present invention are designed to address these issues.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

BRIEF DESCRIPTION OF INVENTION

Broadly, the concept encapsulated in embodiments of the present invention is to rely on two pieces of information for a persistent authentication process and corresponding system and apparatus:

In a preferred, detailed form, a new key pair is generated by the client and passed to the server for each session. Communication for a subsequent session is enabled only if there is a match between this server stored public key and the public key on the client matched to that user (user ID).

Broadly, stated another way, in accordance with a preferred embodiment there is effected an unbroken chain of one-time pass codes to characterise the user when using the client side application which talks to the server. In a particular form the one-time pass codes are actually the public keys of the client generated key pairs. In a further particular preferred form, there is enabled an aspect of renewal whereby the one-time pass codes keep getting replaced at regular intervals (in a preferred form preferably once per connection session at least).

Accordingly in one broad form of the invention there is provided a method of maintaining ongoing authentication of a user of an application without the need to enter and re-enter a username and a corresponding password for each session initiated between a client side application residing on a client side platform and a server; and wherein the password is not stored on the server; the method comprising utilising an unbroken chain of one-time pass codes; each pass code in the chain being unique to the username and client side application; each pass code renewed periodically and preferably at least once during each said session.

Preferably the pass code comprises a client side public key which is maintained persistent on both the client side platform and the server until replaced by the next client side public key in the chain of pass codes.

Preferably the client side public key comprises a public key of a PKI key pair.

Preferably the corresponding client side private key is not shared with the server.

In a further broad form of the invention there is disclosed a device including a processor in communication with a memory adapted to execute an application; said device maintaining ongoing authentication of a user of an application executable on the device without the need to enter and re-enter a username and a corresponding password for each session initiated between a client side application residing on a client side platform on the device and a remote server; and wherein the password is not stored on the server; the method comprising utilising an unbroken chain of one-time pass codes; each pass code in the chain being unique to the username and client side application; each pass code renewed at least once during each said session.

Preferably the pass code comprises a client side public key which is maintained persistent on both the client side platform and the server until replaced by the next client side public key in the chain of pass codes.

Preferably the client side public key comprises a public key of a PKI key pair.

Preferably the corresponding client side private key is not shared with the server.

In a further broad form of the invention there is provided a system including a device having a processor in communication with a memory adapted to execute an application; said device maintaining ongoing authentication of a user of an application executable on the device without the need to enter and re-enter a username and a corresponding password for each session initiated between a client side application residing on a client side platform on the device and a remote server, the system deriving a first and second item of data; said first item of data comprising:

"Something you have" which in a preferred form is a client side public key,

The second item of data comprising "Something you know".

Preferably said second item of data comprises a user PIN/password which is used to create a private key for any given session.

Preferably said second item of data comprises any form of personally identifiable information including but not limited to thumb prints or other biometrics which is used to create a private key for any given session.

Preferably a new key pair is generated by the client and passed to the server for each session and wherein communication for a subsequent session is enabled only if there is a match between this server stored public key and the public key on the client matched to that user (user ID).

In yet a further broad form of the invention there is provided a platform including at least a processor in communication with a memory which executes code to perform a method of authentication of a user; said method comprising effecting an unbroken chain of one-time pass codes to characterise the user when using a client side application executing on said platform which communicates with a remote server over the Internet.

Preferably the one-time pass codes are the public key of the client generated key pair.

In yet a further broad form of the invention there is provided a system for maintaining ongoing authentication of a user of an application without the need to enter and re-enter a username and a corresponding password for each session initiated between a client side application residing on a client side platform and a server, said system utilising a string of one time passcodes which are renewable and wherein renewal is effected by the passcodes being replaced at regular intervals.

In a preferred form an interval comprises a once per session connection interval.

DRAWINGS

Figure 1B:
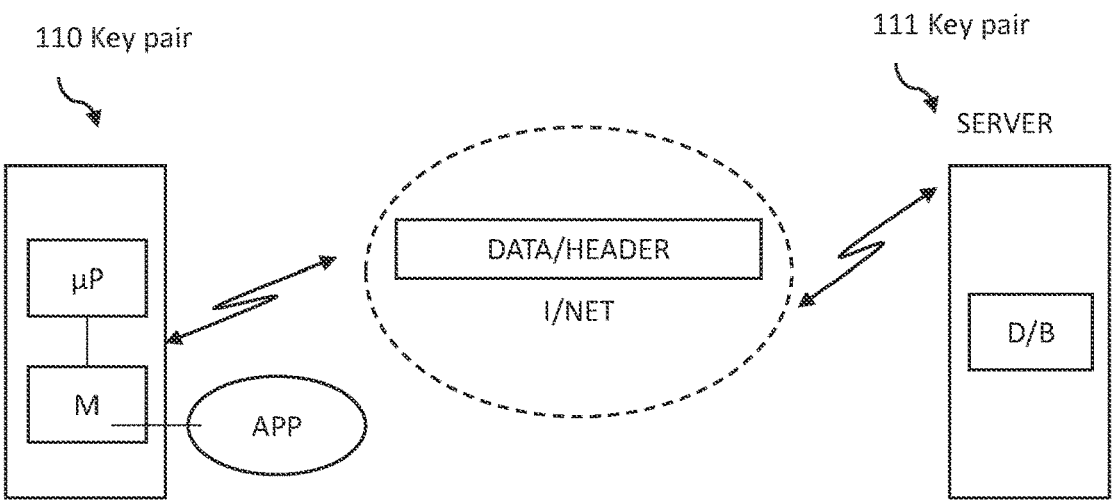

FIG. 1A is a block diagram of functional components on a client platform 24 and server 25 in accordance with a first preferred embodiment FIG. 1B is a block diagram of communication between a client application on the client platform and the server of FIG. 1A.

Figure 2:
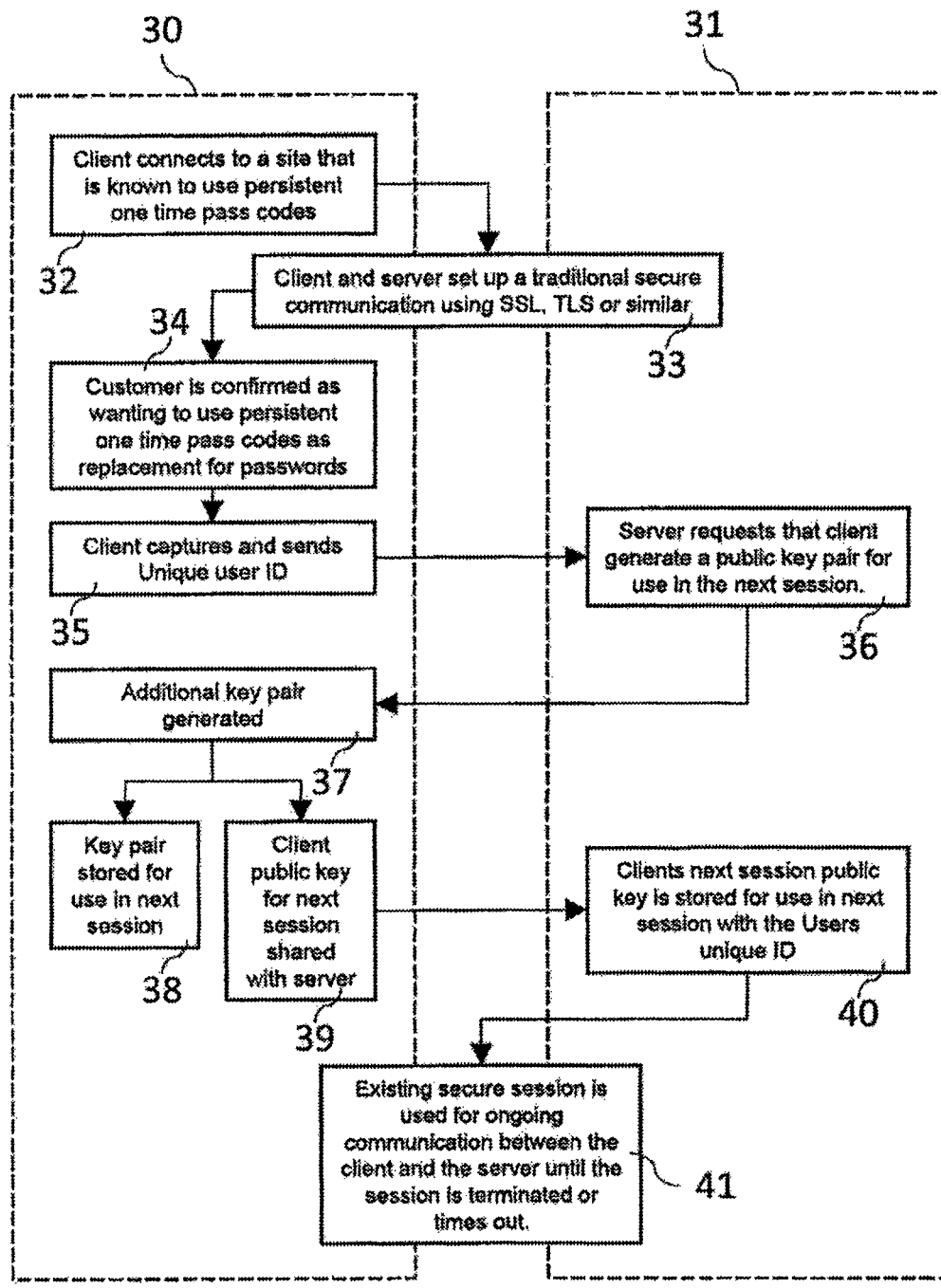

FIG. 2—Control process for an initial use of the example embodiment

Figure 3:
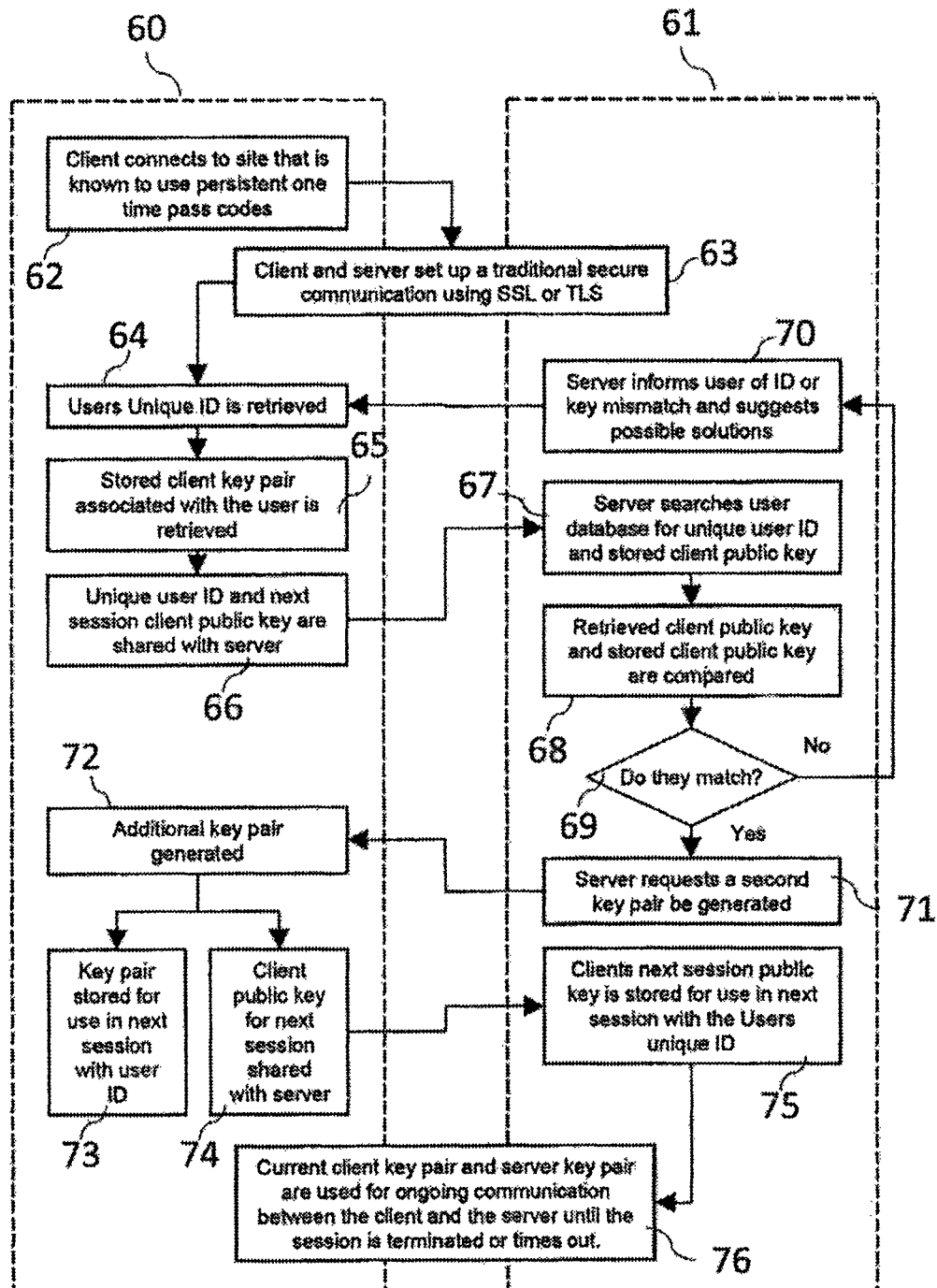

FIG. 3—Control process for a non initial use of the example embodiment

Figure 4:
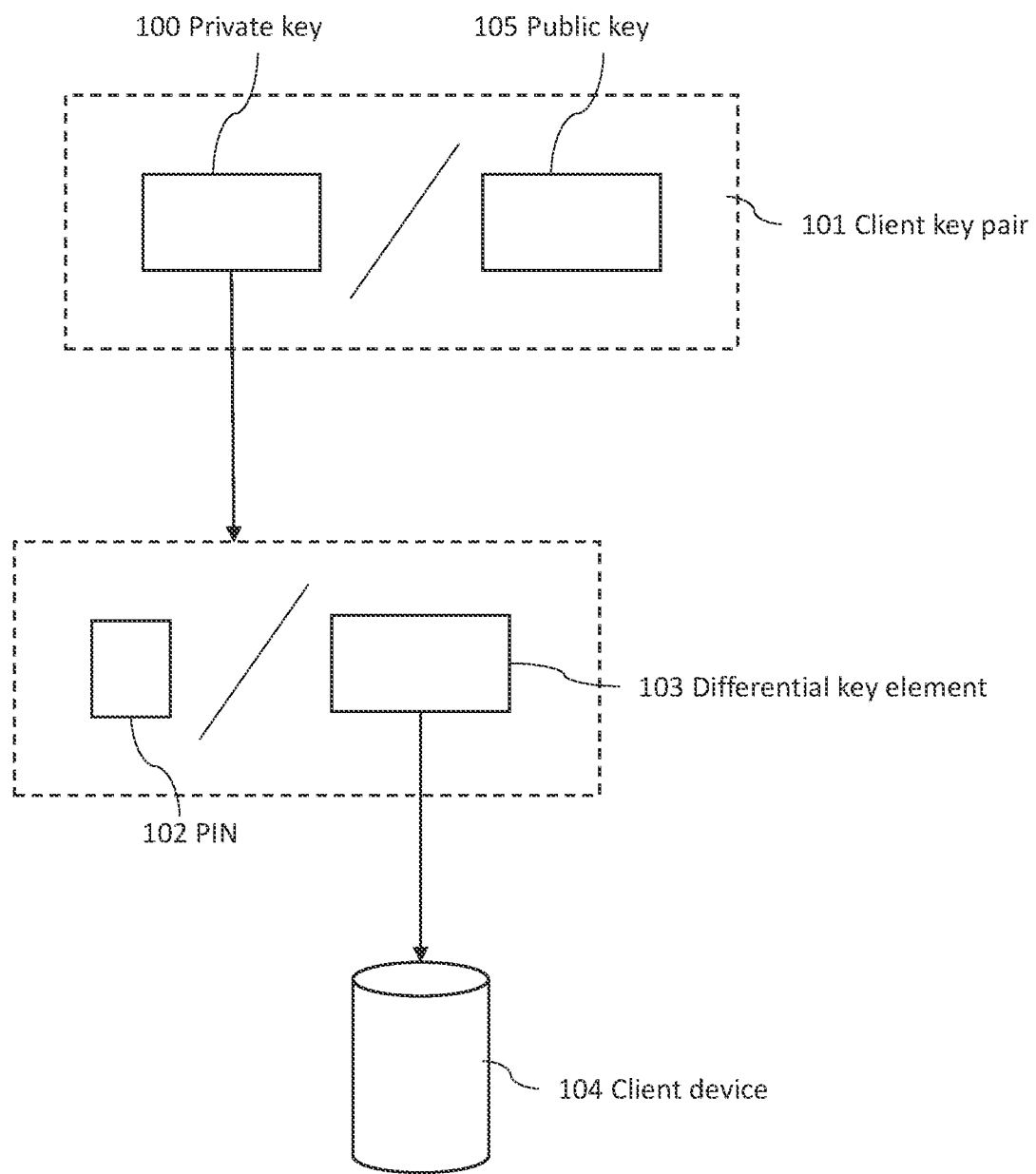

FIG. 4—is a block diagram of a method of construction of a private key according to a further embodiment.

DETAILED DESCRIPTION OF PREFERRED EMBODIMENTS

Broadly, the idea is to rely on two pieces of information for initial and then ongoing authentication:

In a preferred, detailed form, a new public key is generated by the client and passed to the server for each session. Communication for a subsequent session is enabled only if there is a match between this server stored public key and the public key on the client matched to that user (user ID).

Broadly, stated another way, in accordance with a preferred embodiment there is effected an unbroken chain of one-time pass codes to characterise the user when using the client side application which talks to the server. In a particular form the one-time pass codes are actually public keys. In a further particular preferred form, there is enabled an aspect of renewal whereby the one-time pass codes keep getting replaced at regular intervals (once per session at least).

Disclosed is an example embodiment that uses an unbroken chain of one time pass codes as a surrogate for a password in a traditional username and password authentication system.

FIG. 1 shows the key components of an example embodiment. When a user, using a unique user ID 23, connects with a server, an encryption and authentication system such as a public key encryption exchange is typically used.

Typically the user has a client side application 24 that produces a key pair 10 that is used to communicate with the server which uses its own key pair 11. In the known practice of public key cryptography the clients private key 12 is used with the public key of the server 14 to encrypt a message and the server uses the public key of the client 13 and the private key of the server 15 to decrypt the sent message.

Once the identity of the sender 10 and receiver 11 has been verified the two parties share a secret password 17 which is used for high speed encryption and decryption of an encrypted message 16.

Typically the encrypted message 16 uses a secret password 17 that is only used for the length of the communication session, after which the password 17 is discarded and no longer used.

In the example embodiment, the above key exchange and encryption process is expanded to include a second key pair set 18 that is generated by the client. This key pair generation 18 is used to uniquely link the current authenticated session with the next authentication system between the client and the server.

This key pair 18 includes a private key 20 which is stored locally on the client device and a public key 19 which is also stored locally. The stored client public key is also shared with and transferred to the server 25 which then links a stored reference to the unique user ID 21 of the person currently using the client with a stored copy of the client's public key 22.

During subsequent connections between the client and the server, the stored and shared client public key 19, 22, the server's public key 14 and the stored private key on the client 20 are used as current client side public key pairs and an additional key pair is then generated and stored for the follow on session.

FIG. 2 discloses the control process of the initial session of the example embodiment. A user uses an application on the client side 30 of the communication to interact with a server 31.

Initially the user connects to a server that uses persistent one time keys with unique IDs 32. Initially the server and the client use a traditional public key encryption session 33 to secure communications between the client 30 and the server 31.

Next the user is confirmed as wanting to use persistent one time codes 34 and the users unique ID is captured or retrieved from the user or from storage on the client and sent to the server 35. Subsequently the server requests that the client generate a public key pair for use in the next session 36. The client then generates a public key pair 37 which is securely stored at the client for use in the next session 38 and the public key of the key pair is shared with the server 39.

The clients public key that is to be used for the next session is stored on the server using the users unique ID 40. Once this step has been confirmed the existing SSL, TLS or similar connection is used to secure the ongoing communication between the client and the server until the session is terminated or times out 41.

FIG. 3 discloses the control process of the non initial sessions of the example embodiment. A user uses an application on the client side 60 of the communication to interact with a server 61.

Initially the user connects to a server that uses persistent one time keys with unique ID's 62. Initially the server and the client use a traditional public key encryption session 63 to secure communications between the client 60 and the server 61.

Next the unique ID is captured or retrieved from the user or from storage on the client 64. Next the stored client key pair that were stored during the previous session are retrieved using the current users unique user ID 65. Then the users unique ID and the previously stored client public key are shared with the server 66.

The server then searches it's own user database for the users unique ID and retrieves the previously saved client public key 67 for comparison with the shared client public key from the client 68. If the two keys do not match the server informs the user and suggests various measures to address the problem 70. If a match does occur 69, the server then requests 71 that a second public key pair be generated by the client 72 and the key pair is subsequently stored 73. Additionally the public key of the key pair just generated 72 is shared with the server for use in the next session 74. The server then stores the next client public key to be used with the users unique ID 75 and the current key pairs of both the client and the server are used for ongoing communication between the client and the server until the session is terminated or times out 76.

The result is a persistent chain of one time codes in the form of client public keys that can be used to establish and perpetuate a secure connection between a client system and a server system over multiple and ongoing sessions.

Alternative Embodiments

The example embodiment uses the generation and linking of a series of client side public keys that are stored on both the client side and the server side as a persistent identifier for the purposes of authentication. An alternative embodiment could use a chain of TLS session keys such as shared AES pass codes as a persistent identifier. In this case each time a shared client side public key is used, a follow on key is generated and stored on both sides for use in the next session. The advantage of using a client side public key as the persistent identifier is that the client side private key is not shared with the server, unlike in the case of a TLS session key, and therefore adds a level of security to the system.

In the example embodiment the client is used to generate key pairs for the process to use. In an alternative embodiment the server could be used to generate key pairs and share them with the client for use in follow on sessions.

The example embodiment shares a server stored copy of the next client public key, with a shared copy of the client public key coming from the client during the current session. An alternative embodiment could use any equivalent of the client public key for comparison purposes including but not limited to a checksum or hash of the client public key.

Further Embodiment

With reference to FIG. 4 and in a particular preferred form an embodiment of the present invention reliant on two pieces of information in accordance with a method of construction of a private key according to a further embodiment.

"Something you have" which in a preferred form is the client side public key

"Something you know" which in a preferred form is the user PIN/password which is used to create a private key for any given session.

In a further enhancement of the example embodiment the private key 100 of the client key pair 100, 105 can be linked to a specific user of the client device to enforce two factor authentication. This is achieved by requiring the user to enter a PIN or other "thing that the user must know" with "a thing the user must have" in this case a required private key 100 of a valid PKI client key pair (formed from private key 100 and public key 105) in a two factor authentication using the example embodiment.

In this enhancement the private key 100 of the client key pair 101 is broken into two components 102 103. The first component is a PIN 102 that is chosen by the user to verify their identity in future sessions. This PIN 102 is subtracted from a complete private key 100 to produce a differential key element 103. The differential key element 103 cannot be used as a successful private key 100 in a client key pair 101 unless the user adds a correct PIN 102 to the correct differential key element 103 in order to produce a useable private key 100 of useable key pair 101.

The differential key element can be safely stored 104 on the client device for use in the next session because the element 104 cannot be successfully used without the required PIN 102.

In practice the PIN 102 would be requested of the user at the beginning of each session, then added to the differential key element 103 in order to establish successful public key data encryption and decryption.

In addition the PIN 102 would be temporarily stored on the client and then used to generate a suitable differential key element 103 for the next session private key 20.

The example embodiment show the use of a PIN as a "thing the user must know" in order to achieve two factor authentication. An alternative embodiment could use any form of personally identifiable information including but not limited to thumb prints or other biometrics.

The example embodiment uses subtraction to produce a differential key element by subtracting a PIN from a private key of a client side key pair. An alternative embodiment could use any calculation that allows the personally identifiable factor to be combined with a second file element in order to produce a useable private key in a client side key pair.

The above describes only some embodiments of the present invention and modifications obvious to those skilled in the art can be made thereto without departing from the scope and spirit of the present invention.

INDUSTRIAL APPLICABILITY

Embodiments of the invention may be applied in contexts where authentication of apparatus or an apparatus plus user combination is required to be verified prior to further communication with that apparatus.

The invention claimed is:

1. A method of maintaining ongoing authentication of a user of an application without a need to store a password on a server for subsequent authentication of that user for each subsequent session initiated between a client side application residing on a client side platform and a server; and wherein the password is not stored on the server; the method comprising: utilising an unbroken chain of one-time pass codes; each pass code in the chain being unique to the username and client side application; each pass code renewed at least once during each said subsequent session; and wherein the pass code comprises a public/private key pair; and wherein a process of replacing the public/private key pair once per session comprises the steps of:
   a. generating a replacement public/private key pair on either the client or the server;
   b. saving the replacement public key of the replacement public/private key pair to the server referenced against the username credentials of the user;
   c. utilizing the password supplied by the user to generate a differential key element of the private key on either the server or the client;
   d. saving the differential key element of the private key only on the client side platform;
   and
   e. permitting on going use of the application during the session connection;
   initiation of the subsequent session by a subsequent session request requiring entry of the password by the user into the client side platform in order to initiate the subsequent session; the client side platform or the server regenerating the private key of the public/private key pair by use of the password and the differential key element thereby to authenticate the subsequent session against the public/private key pair;
   following authentication of the subsequent session, the subsequent session proceeding in accordance with steps a through e.

2. The method of claim 1 wherein an element of the pass code comprises a client side public key which is maintained persistent on both the client side platform and the server until replaced by the next client side public key in the chain of pass codes.

3. The method of claim 2 wherein the client side public key comprises a public key of a PKI key pair.

4. The method of claim 3 wherein the corresponding client side private key is not shared with the server.

5. A method of maintaining ongoing authentication of a user of a client side application without a need to store a password on a server for subsequent authentication of that user for each subsequent session initiated between the client side application residing on a client side platform and a server, the method deriving a first and second item of data; said first item of data comprising:

"Something you have" comprising a public/private key pair;

the second item of data comprising "Something you know" comprising the password; and wherein a process of replacing the public/private key pair once per session comprises the steps of:

a. generating a replacement public/private key pair on either the client or the server;

b. saving the replacement public key of the replacement public/private key pair to the server referenced against username credentials of the user;

c. utilizing the password supplied by the user to generate a differential key element of the private key on either the server or the client;

d. saving the differential key element of the private key only on the client side platform;

and e. permitting on going use of the application during the session connection;

initiation of the subsequent session by a subsequent session request requiring entry of the password by the user into the client side platform in order to initiate the subsequent session; the client side platform or the server regenerating the private key of the public/private key pair by use of the password and the differential key element thereby to authenticate the subsequent session against the public/private key pair;

following authentication of the subsequent session, the subsequent session proceeding in accordance with steps a through e.

6. The method of claim 5 wherein said second item of data comprises said password in the form of a user PIN which is used to recreate the private key in order to authenticate any given session.

7. The method of claim 6 wherein said second item of data comprises any form of personally identifiable information including but not limited to thumb prints or other biometrics which is used to recreate the private key in order to authenticate any given session.

8. The method of claim 6 wherein a new key pair is generated by the client and passed to the server for each session; communication for a subsequent session is enabled only when there is a match between this server stored public key and the public key on the client matched to the username credentials of the user.

9. A method of authentication of a user; said method comprising: effecting an unbroken chain of one-time pass codes to characterise the user when using a client side application which communicates with a server; and wherein the pass code comprises a public/private key pair; and wherein a process of replacing the public/private key pair once per session comprises the steps of:

a. generating a replacement public/private key pair on either the client or the server;

b. saving the replacement public key of the replacement public/private key pair to the server referenced against the username credentials of the user;

c. utilizing a password supplied by the user to generate a differential key element of the private key on either the server or the client;

d. saving the differential key element of the private key only on the client side platform;

and e. permitting on going use of the application during the session connection;

initiation of a subsequent session by a subsequent session request requiring entry of the password by the user into the client side platform in order to initiate the subsequent session; the client side platform or the server regenerating the private key of the public/private key pair by use of the password and the differential key element thereby to authenticate the subsequent session against the public/private key pair;

following authentication of the subsequent session, the subsequent session proceeding in accordance with steps a through e.

10. The method of claim 9 wherein an element of the one-time pass codes is the public key of the client generated key pair.

11. A method of maintaining ongoing authentication of a user of a client side application on a client without a need to store a password on a server for subsequent authentication of that user for each subsequent session initiated between a client side application residing on a client side platform and a server, said method comprising: utilising a string of one time passcodes which are renewable and wherein renewal is effected by the passcodes being replaced once per subsequent session connection; and wherein the pass codes comprise a public/private key pair; and wherein a process of replacing the public/private key pair once per session comprises the steps of:

a. generating a replacement public/private key pair on either the client or the server;

b. saving the replacement public key of the replacement public/private key pair to the server referenced against username credentials of the user;

c. utilizing the password supplied by the user to generate a differential key element of the private key on either the server or the client;

d. saving the differential key element of the private key only on the client side platform;

and e. permitting on going use of the application during the session connection;

initiation of the subsequent session by a subsequent session request requiring entry of the password by the user into the client side platform in order to initiate the subsequent session; the client side platform or the server regenerating the private key of the public/private key pair by use of the password and the differential key element thereby to authenticate the subsequent session against the public/private key pair;

following authentication of the subsequent session, the subsequent session proceeding in accordance with steps a through e.

12. The method of claim 11 wherein the password remains the same for each session and is entered by the user to commence authentication of a new session connection.

13. The method of claim 12 wherein the password is a PIN.

14. The method of claim 13 wherein during subsequent connections between the client and the server, the stored and shared client public key, the servers public key and the regenerated private key on the client are used as current client side public/private key pair and an additional key pair is then generated and stored for the follow on session.

15. The method of claim 14 wherein the username credentials are captured or retrieved from the user or from storage on the client and then the stored client key pair that was stored during the previous session is retrieved using the current username credentials following which the username credentials and the previously stored client public key are shared with the server.

16. A device including a processor in communication with a memory adapted to execute an application on the device; said device maintaining ongoing authentication of a user of the application executable on the device without a need to store a password on a server for subsequent authentication of that user for each subsequent session initiated between the application residing on the device and a remote server; and wherein the password is not stored on the server; the method comprising: utilising an unbroken chain of one-time pass codes; each pass code in the chain being unique to the username and application; each pass code renewed at least once during each said subsequent session; and wherein the pass code comprises a public/private key pair; and wherein a process of replacing the public/private key pair once per session comprises the steps of:
   a. generating a replacement public/private key pair on either the device or the server;
   b. saving the replacement public key of the replacement public/private key pair to the server referenced against username credentials of the user;
   c. utilizing the password supplied by the user to generate a differential key element of the private key on either the server or the device;
   d. saving the differential key element of the private key only on the device;
   and
   e. permitting on going use of the application on the device during the session connection;
   initiation of the subsequent session by a subsequent session request requiring entry of the password by the user into the device in order to initiate the subsequent session; the device or the server regenerating the private key of the public/private key pair by use of the password and the differential key element thereby to authenticate the subsequent session against the public/private key pair;
   following authentication of the subsequent session, the subsequent session proceeding in accordance with steps a through e.

17. The device of claim 16 wherein an element of the pass code comprises a client side public key on the device which is maintained persistent on both the device and the server until replaced by the next client side public key in the chain of pass codes.

18. The device of claim 17 wherein the client side public key comprises a public key of a PKI key pair.

19. The device of claim 17 wherein the corresponding client side private key is not shared with the server.

20. The method of claim 1 wherein the password is a PIN.
21. The method of claim 9 wherein the password is a PIN.
22. The device of claim 16 wherein the password is a PIN.

* * * * *